Inventor
Henry A. Peterson
By Jacobi & Jacobi
Attorneys

May 15, 1928.
H. A. PETERSON
AUTOMOBILE GLARE SHIELD
Filed Feb. 23, 1927 2 Sheets-Sheet 2
1,669,838
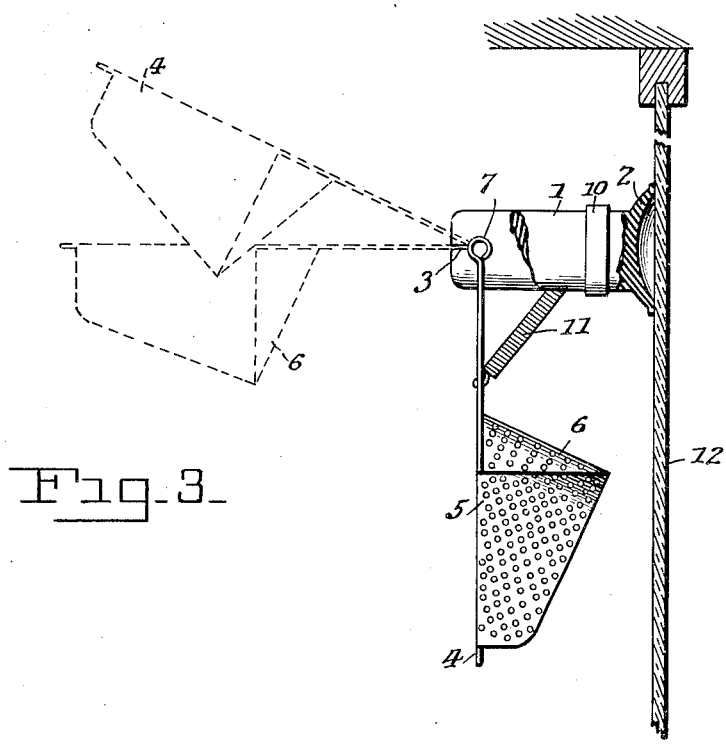
Fig-3-
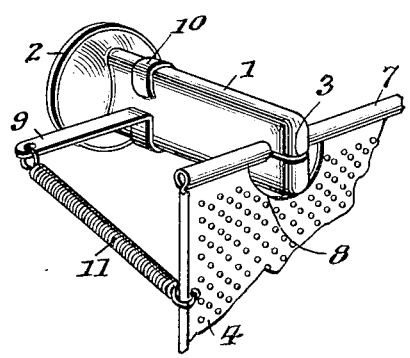
Fig-4-
Inventor
*Henry A. Peterson*
By *Jacobi & Jacobi*
Attorneys Patented May 15, 1928. 1,669,838

UNITED STATES PATENT OFFICE.

HENRY A. PETERSON, OF MITCHELL, SOUTH DAKOTA.

AUTOMOBILE GLARE SHIELD.

Application filed February 23, 1927. Serial No. 170,305. REISSUED

This invention relates to a glare shield especially adapted to be used upon automobiles, and it consists in the novel features hereinafter described and claimed.

An object of the invention is to provide a shield of the character stated which may be easily and quickly applied to the sheet of glass of a wind shield and removed therefrom and having its parts and features so arranged and assembled as to eliminate the use of bolts or screws for holding the glare shield in proper position upon the wind shield of the automobile.

A further object of the invention is to provide in a shield of the character stated a structure which is simple, durable and economical in production and when in use upon the wind shield presents an attractive appearance.

A still further object of the invention is to provide a device of the character stated which will effectually protect the vision of automobile drivers by breaking up the bright light in advance of the machine enabling them to see the road ahead. The shield may not only be used as a protection against the rays of sunlight, but it also serves as means for protecting the eyesight of drivers when facing bright headlights of approaching traffic.

With these and other objects in view the structure comprises bracket arms composed of soft and pliable material, preferably rubber, and provided at one end with suction cups and at their opposite ends with bearing recesses. The suction cups are adapted to frictionally engage the surface of the wind shield glass and the bearing recesses are adapted to receive portions of a perforated plate having a visor for the protection of the driver's eyesight. Spring means are provided between the perforated plate and one or both of the bracket arms for holding the plate at a desired position within the arm and also for preventing the plate from vibrating or rattling when the automobile, to which the device is applied, is in motion.

In the accompanying drawing:—

Figure 3 is a vertical sectional view of the shield with the glare shield applied thereto, and parts thereof removed and parts thereof broken away and shown in section.

Figure 4 is a fragmentary perspective view of features of the glare shield.

The glare shield structure includes arms 1, of soft pliable material, preferably rubber, and the arms are provided at one end with integral suction or vacuum cups 2 of usual pattern. The arms 1 are provided at their opposite ends with bearing recesses 3.

Figure 1:
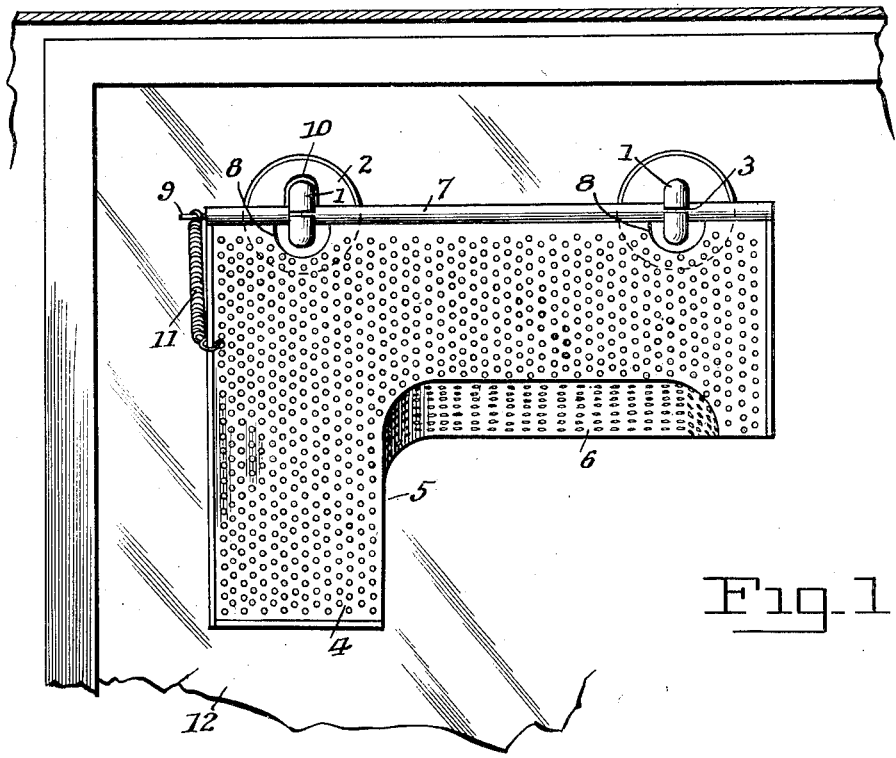
Figure 1 is a fragmentary side elevational view of the wind shield of an automobile with the glare shield applied thereto.
Figure 2:
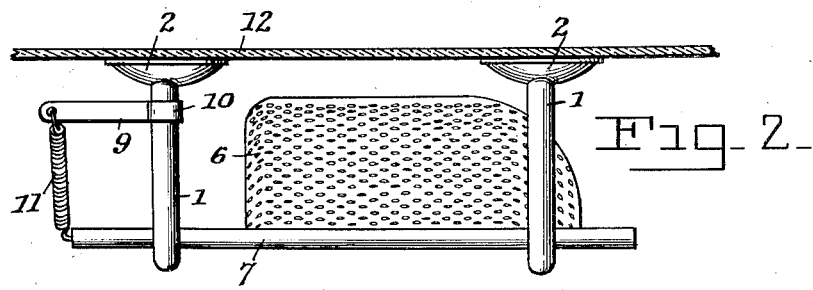
Figure 2 is a transverse sectional view of the wind shield with the shield applied thereto.

The glare shield structure also includes a perforated plate 4 cut away at one corner forming a recess 5 and a perforated visor 6 disposed along the upper edge of the recess 5. The plate 4 is curled at its upper edge as at 7 which forms a stiffening ridge disposed transversely across the upper edge of the said plate. The plate 4 is further provided at its upper portion with recesses 8. The curled portion 7 bridges the recesses 8 as thus shown in Figure 1 of the drawings. The inner end portions of the arms 1 are received in the recesses 8 and the recesses 3 receive the portion of the curled portions 7 which bridge the recesses 8. The edges of the recesses 3 bear frictionally against the surface of the curled portion 7. A finger 9 is provided at one end with a clip 10 which engages around one of the arms 1 and a coiled spring 11 is connected at one end with the finger 9 and connected at its other end with the end of the disc portion of the plate 4.

The wind shield glass is shown at 12. When the device is applied to the wind shield glass, the visor 6 is disposed toward the glass. The edges of the cups 2 are pressed firmly against the surface of the wind shield glass. Thus the said cups are compressed and the air is exhausted from under them and partial vacuums are established whereby the cups and the arm are securely held in position upon the wind shield glass. The device should be positioned upon the wind shield glass so that the light from an approaching car appears to the driver just above the visor when the approaching car is at a distance of approximately ten rods. The glare shield should not be positioned too high or too low with relation to the driver of the machine. The recess 5 provides an opening through which the driver has clear vision and may observe the roadway ahead and at the same time his vision is protected against the strong rays of light coming from the headlight of the approaching vehicle.

When it is desired to remove the device from the wind shield this may be readily done by inclining the bracket arms 1 with relation to the wind shield glass so that the edges of the cups 2 are pulled away from the surface of the glass, thus destroying the vacuums.

From the foregoing description taken in conjunction with the accompanying drawings it will be seen that a glare shield structure of simple and durable form is provided, and that the same will effectually protect the vision of the driver of a car against the sharp rays of light of an approaching machine and may also serve for protecting his vision against the rays of sunlight. Furthermore, the device is of such nature that it may be easily and quickly applied to the wind shield or removed therefrom and may be stored or carried in a small space when not in use upon the wind shield.

Having described the invention, what is claimed is:

1. A glare shield structure comprising a bracket arm of soft pliable material provided at one end with a cup portion and at its opposite end with a bearing recess, a shield plate pivotally supported in the recess, a finger mounted upon the arm at a point between the cup portion and the recess thereof, and a spring connected with the finger and the plate.

2. A glare shield structure comprising a bracket arm of soft pliable material provided at one end with a cup portion and at its opposite end with a bearing recess, a shield plate pivotally mounted in the recess, a finger supported upon the arm between the cup portion and the recess thereof and slidable longitudinally of the arm and a spring connected with the finger and the plate.

In testimony whereof I affix my signature.

HENRY A. PETERSON.